United States Patent Office 2,719,685
Patented Oct. 4, 1955

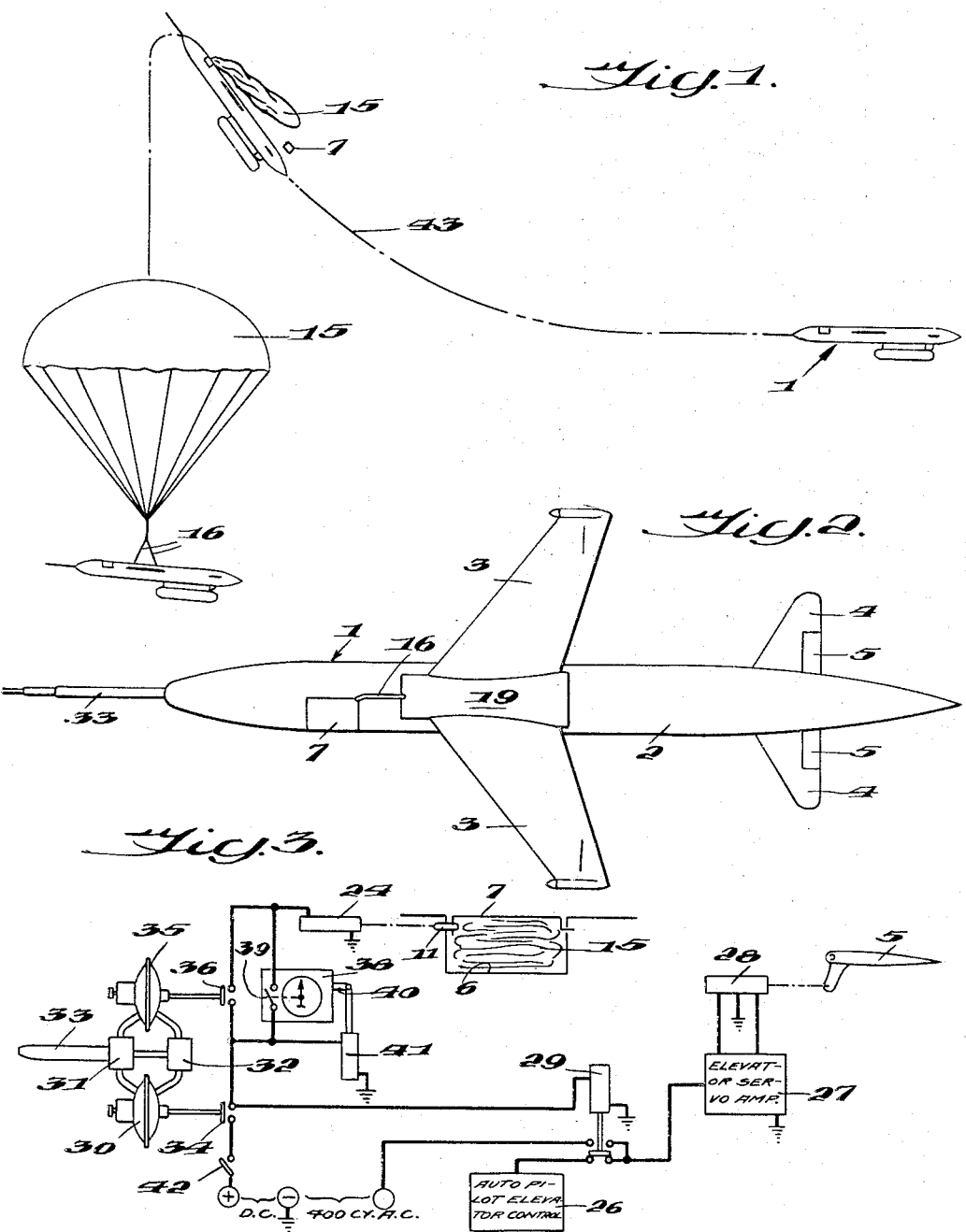

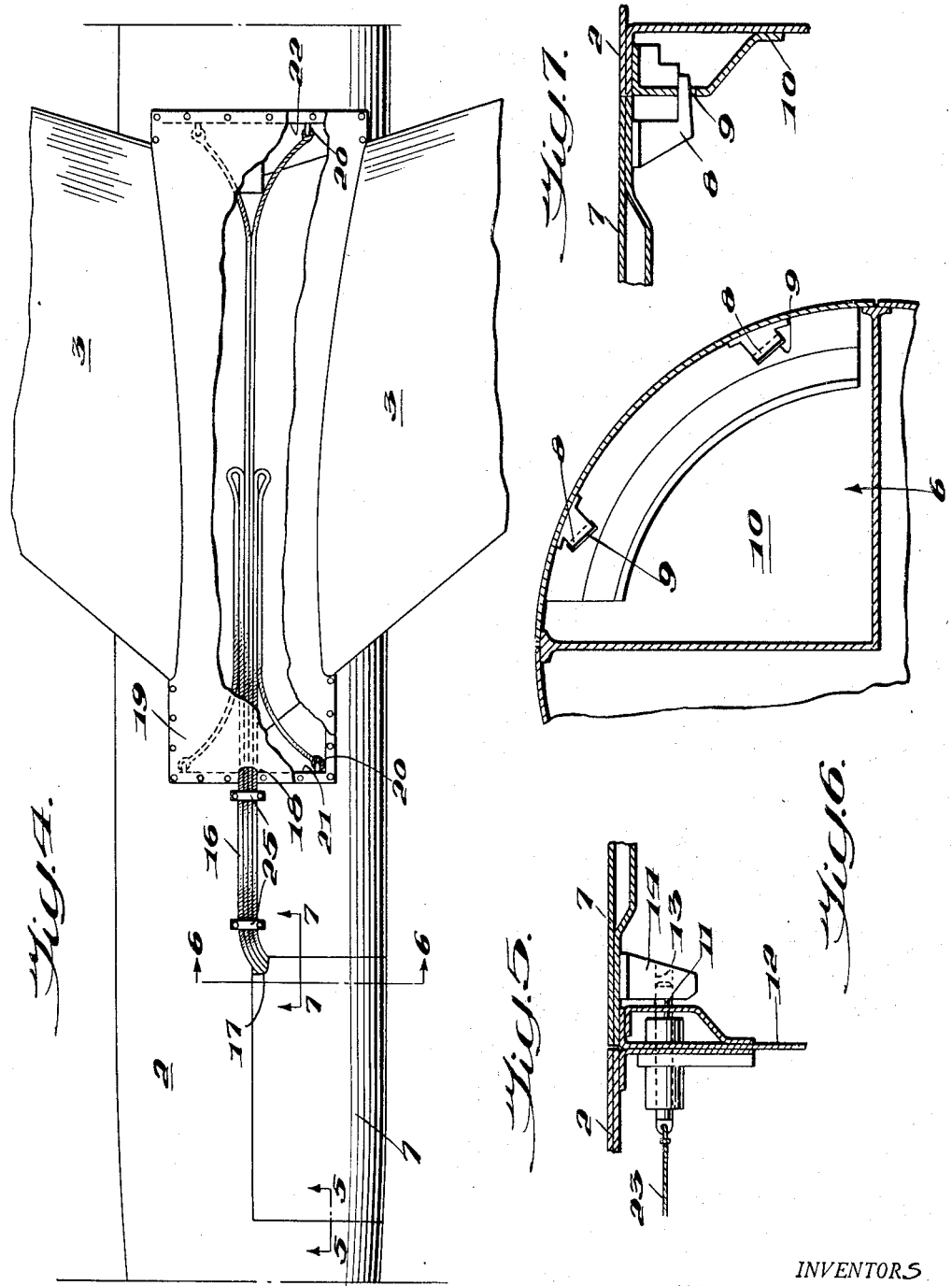

2,719,685

PARACHUTE RECOVERY SYSTEM FOR AIRCRAFT

Welcome W. Bender, John Donald Rauth, and Howard W. Merrill, Baltimore County, and Urban W. Richardson, Baltimore, Md., assignors to The Glenn L. Martin Company, Middle River, Md., a corporation of Maryland Application January 25, 1950, Serial No. 140,432

9 Claims. (Cl. 244—139)

This invention relates to an improved parachute recovery system for safely lowering aircraft to the earth, which system is particularly useful in the recovery of pilotless aircraft.

In the use of pilotless aircraft, particularly of the high-speed type used for such purposes as testing jet engines and for anti-aircraft target purposes, it is highly desirable to provide for safely lowering the aircraft after its fuel has been exhausted. Since aircraft of this type frequently operate over a rather extensive area, it is usually impractical to bring them back to earth in a conventional manner by "flying" them in to a landing by radio control. The present invention is intended to provide an arrangement by means of which such craft can be safely lowered to earth by parachute and recovered for further use. While it has previously been proposed to use parachutes for lowering aircraft, the problems involved when high speed aircraft are used have heretofore made such a system impractical, since the shock loads due to the sudden opening of a parachute while the aircraft is moving at high speeds will normally destroy either the parachute, the aircraft, or both.

It is an object of this invention to provide means for effectively slowing down a high speed pilotless aircraft so that a parachute of sufficient size to safely lower the craft can be opened without damage to either the parachute or the aircraft.

It is a further object to provide control means for a parachute recovery system wherein, when the aircraft slows to a predetermined speed, the elevators will be actuated automatically to cause the aircraft to zoom steeply, and thereafter when the speed has been greatly reduced by the zooming action to automatically release the parachute.

It is a further object to provide in such a control system, speed responsive elements on the aircraft to initiate the zoom and the parachute release.

It is a still further object to provide a timing mechanism, operative after the lapse of a predetermined period of time from the initiation of the zoom to cause release of the parachute in the event that the speed responsive means normally used for this purpose fails to operate as intended.

Further and other objects will be obvious from a consideration of the following specification and claims when taken in view of the accompanying drawing.

In the drawing:

Figure 1 is a diagrammatic view showing various positions of the aircraft and parachute during successive stages of the recovery procedure.

Figure 2 is a top plan view of the aircraft.

Figure 3 is a schematic diagram of the automatic control system.

Figure 4 is an enlarged fragmentary plan view of the fuselage showing the manner in which the parachute is attached thereto.

Figure 5 is a section taken on line 5—5 of Figure 4.

Figure 6 is a section taken on line 6—6 of Figure 4 and

Figure 7 is a section taken on line 7—7 of Figure 4.

The invention is shown as applied to a high speed, jet powered, pilotless aircraft 1 of a type especially well adapted for use as a target for anti-aircraft gunnery practice, and having the usual fuselage 2, wings 3, and tail surfaces 4 which include pitch varying means such as elevators 5. Formed in the forward portion of the fuselage 2 is a parachute stowage compartment 6 having a releasable cover 7 which, as best shown in Figures 5, 6 and 7, is provided with a pair of rearward extending lugs 8 which extend into suitable slots 9 formed in the bulkhead 10 constituting the rearward end wall of the compartment. The forward edge of the cover 7 is normally held in place by means of a releasable bolt or detent 11 slidably mounted in the forward bulkhead 12, and which extends into a hole 13 formed in a lug 14 depending from the central portion of the forward edge of the cover 7. A parachute 15 is adapted to be stowed in the compartment 6 and has its load lines 16 extending outwardly through an opening 17 provided in the rear edge of the cover 7, thence along the outer surface of the fuselage and in through an opening 18 provided in the leading edge of an expendable fairing 19 to suitable eye-bolts 20 carried by the bulkheads 21 and 22 as shown in Figure 4. Bolt 11 is adapted to be released from engagement with lug 14 by a suitable flexible pull cable 23 extending to a parachute release linear actuator 24 (Figure 3). As shown in Figure 4 the portion of the load lines 16 running along the exterior of the fuselage is held down by suitable clips 25.

The parachute 15 is normally stowed within the compartment 6 in a tightly packed condition so that when the bolt 11 is released by actuation of the linear actuator 24, the leading edge of the cover will be forced by the parachute outwardly into the slipstream, which will cause it to swing upwardly and rearwardly, pulling the lugs 8 out of the slots 9 and causing the entire cover to fly off from the aircraft. The parachute being then exposed to the airstream will be dragged out of the compartment and, as it begins to fill out, will rip loose the clips 25 and the expendable fairing 19.

Since, with a high-speed craft of the type shown, damage would result to either the craft or the parachute were the latter released at high-speed, it is essential that means be provided to slow the aircraft down prior to parachute release. However, if it were attempted to merely let the aircraft slow down due to its own drag forces, the lateral controllability of the aircraft would be very apt to be lost since the lateral control surfaces become rapidly less effective as the speed decreases. As a result such a scheme would in most cases result in the aircraft falling out of control before a safe parachute release speed was obtained with the result that the subsequent release of the parachute would be liable to result in an entanglement of the parachute with the aircraft. Applicants have therefore provided means for causing the aircraft to zoom steeply well before the craft has slowed to such speed as might result in loss of lateral control. In the zoom, the speed of the aircraft will of course fall-off quite rapidly and a safe parachute release speed will be attained before the aircraft will have had a chance to fall-off laterally out of control.

To attain these results, applicants have provided an automatic zoom control means which, when the speed of the aircraft has fallen to a predetermined value (in this case about 275 M. P. H.), will apply full "up" elevator to cause the craft to go into the zoom. Normally the elevator of such an aircraft is under the control of an auto-pilot, diagrammatically indicated at 26, the elevator control portion of which provides a 400 cycle A. C. voltage of a certain phase whenever the auto-pilot mechanism senses the need for "up" elevator, and a 400 cycle A. C. voltage substantially 180° out of phase therewith when the auto-pilot senses the need for "down" elevator operation. The output from the auto-pilot is applied to a conventional phase sensitive servo-amplifier 27 which in turn causes suitable relays therein (not shown) to correspondingly control the linear actuator 28 for the elevators. The details of both the auto-pilot and the servo-amplifier are well known in the art and form no part of the present invention. Suffice it to say that in the instant invention, the zoom control means is provided to disconnect the servo-amplifier from the auto-pilot and to connect it to a steady source of 400 cycle A. C. voltage of such value and phase as would correspond to a full "up" signal.

The zoom control means includes a zoom control relay 29 arranged as shown in Figure 3. To control relay 29 there is provided a differential pressure responsive switch assembly 30 which has its pressure chambers connected respectively to the static chamber 31 and the dynamic pressure chamber 32 of a Pitot tube assembly 33. Whenever the differential in pressure within the unit 30 drops below a predetermined value (which will correspond to the predetermined speed at which the zoom is to be initiated) an electrical circuit will be completed at 34 to energize the zoom control relay 29 to reverse its contacts as above described.

To control the energization of the parachute release actuator 24 parachute release control means including a second differential pressure switch 35 is provided, which switch is adapted to close its contacts 36 when the speed of the aircraft has subsequently dropped to some lower predetermined value, say about 150 M. P. H. This will result in energization of the actuator 24 which will release the bolt or detent 11 and cause the cover 7 and parachute 15 to be subjected to the airstream as above described.

To ensure release of the parachute if for any reason the aircraft does not slow down to this latter predetermined speed within a reasonable time after initiation of the zoom, supplementary timer means is provided to energize the actuator 24. As shown in Figure 3, a timer mechanism 38 is arranged to close its contacts 39 after the expiration of a predetermined time after the zoom has commenced. The timer includes a trip lever 40 which is adapted to be actuated by a solenoid 41 to initiate operation of the timer at the same time that the zoom control solenoid 29 is energized.

It should be noted that neither switch contacts 36 nor supplemental timer contacts 39 of the parachute release control means are effective to complete the circuit to the release actuator 24 until after the zoom control switch contacts 34 have been closed to initiate a zoom of the aircraft since the latter contacts 34 are in series with the former. Thus the parachute release control means is controlled in part by the zoom control means to insure the proper sequence of operation.

A normally open arming switch 42 is shown in the diagram of Figure 3 and is arranged to be closed by means not shown only after the craft has been brought up to a speed well in excess of the zoom initiating speed. Since in this particular application, wherein the aircraft is provided with a ram jet engine, it is normally carried by a mother plane to a speed well in excess of 275 M. P. H., in order to start the ram jet engine before its launching, switch 42 is arranged to be closed during the actual launching process, and thus prevents premature operation of the zoom control relay or parachute release actuator.

The operation of the system is believed to be quite obvious from the above description. As shown in Figure 1, the aircraft will follow a path somewhat as shown by dotted line 43. After the fuel has been exhausted, or in the event that the jet engine goes out for some reason or another, the craft will coast along at a more or less constant altitude until its airspeed drops to substantially 275 M. P. H. At this point, differential switch 30 will be actuated causing energization of the zoom control relay 29 and of the timer starting solenoid 41. As above described, energization of relay 29 will disconnect the elevator servo-amplifier from its normal auto-pilot control and will switch it to a constant source of alternating voltage of such phase as to cause the elevator to be swung to a full "up" position. The aircraft will then immediately zoom steeply and will lose forward speed rapidly in the zoom. When the speed in the zoom has dropped off to 150 M. P. H., contacts 36 of pressure switch 35 will be closed to energize the actuator 24 to release the detent 11 allowing the cover 7 of the parachute compartment to fly off from the craft. The parachute will then be drawn out by the slipstream and, as it begins to take the load, its load lines 16 will rip loose clips 25 and fairing 19 so that the load lines will be in proper relationship to the center of gravity of the aircraft. The craft will then be gently lowered to earth. It should be pointed out that in Figure 1, the relative size of the aircraft has been greatly exaggerated to more clearly illustrate the action.

As above set forth, if, for any reason, the speed should not fall off to 150 M. P. H. during the zoom before the expiration of the timing cycle of the timer (substantially 15 or 20 seconds), upon the expiration of the timing cycle, the timer contacts 39 will complete the circuit to the actuator 24 and release the parachute. While safe recovery in this latter event is less certain, this supplemental timer does provide means whereby at least some aircraft which would otherwise be lost can be safely recovered.

The particular type of auto-pilot and elevator servo-amplifier described are for illustration purposes only since obviously any equivalent auto-pilot arrangement could be substituted without affecting the basic principle of operation. The essential requirement is merely that the zoom control means be capable of switching the elevator actuator from its normal control unit to a means for feeding thereto a steady "up" elevator signal. Whether this "signal" be mechanical, electrical or hydraulic in nature will of course depend upon the particular type of auto-pilot control system employed.

While but one embodiment has been shown and described it is obvious that many changes and alterations can be made without departing from the spirit and scope of the invention as defined in the appended claims.

We claim as our invention:

1. Recovery apparatus for a high speed aircraft having a controllable elevator, said aircraft being provided with a parachute compartment opening to the exterior surface of said aircraft, a parachute normally housed within said compartment and having its load lines connected to the aircraft, a releasable cover for said compartment and detent means for releasably holding said cover in position over said compartment, speed responsive means carried by said aircraft and responsive to a decrease in the airspeed to a predetermined value for actuating said elevators to an "up" position to cause said aircraft to zoom, means responsive to a further decrease in air speed to a lower predetermined value for actuating said detent means to release said cover from said compartment whereby said parachute will be exposed to and pulled from said compartment by the airstream and opened thereby to safely lower the aircraft.

2. Recovery apparatus for a high speed aircraft having pitch varying means, comprising a parachute attached to said aircraft and normally held in stowed relationship on said aircraft, zoom control means carried by the aircraft and responsive to a decrease in the airspeed of said aircraft to a predetermined value for actuating said pitch varying means to cause said aircraft to zoom, and parachute release control means controlled in part by said zoom control means for causing release of said parachute into the slipstream, said zoom control means preventing operation of said parachute release control means until after actuation of said zoom control means.

3. Recovery apparatus for a high speed aircraft having pitch varying means, comprising a parachute attached to said aircraft and normally held in stowed relationship on said aircraft, zoom control means carried by the aircraft and responsive to a decrease in the airspeed of said aircraft to a predetermined value for actuating said pitch varying means to cause said aircraft to zoom, and parachute release control means for causing release of said parachute into the slipstream, said parachute release control means including means responsive to a further decrease in the airspeed to a second predetermined value to release said parachute.

4. Recovery apparatus for a high speed aircraft having pitch varying means, comprising a parachute attached to said aircraft and normally held in stowed relationship on said aircraft, zoom control means carried by the aircraft and responsive to a decrease in the airspeed of said aircraft to a predetermined value for actuating said pitch varying means to cause said aircraft to zoom, and parachute release control means for causing release of said parachute into the slipstream, said parachute release control means including means responsive to a further decrease in the airspeed to a second predetermined value to release said parachute, and supplemental timer means responsive to the expiration of a predetermined time after the actuation of said zoom control means to also release said parachute.

5. Recovery apparatus for a high speed aircraft having pitch varying means, comprising a parachute attached to said aircraft and normally held in stowed relationship on said aircraft, zoom control means carried by the aircraft and responsive to a decrease in the airspeed of said aircraft to a predetermined value for actuating said pitch varying means to cause said aircraft to zoom, and parachute release control means for causing release of said parachute into the slipstream, said parachute release control means including timer means responsive to the expiration of a predetermined time after the actuation of said zoom control means to release said parachute.

6. Recovery apparatus for a high speed aircraft having pitch varying means, comprising a parachute attached to said aircraft and normally held in stowed relationship on said aircraft, zoom control means carried by the aircraft for actuating said pitch varying means to cause said aircraft to zoom, and parachute release control means controlled in part by said zoom control means for causing release of said parachute into the slipstream, said zoom control means preventing operation of said parachute release control means until after actuation of said zoom control means.

7. Recovery apparatus for a high speed aircraft having pitch varying means, comprising a parachute attached to said aircraft and normally held in stowed relationship on said aircraft, zoom control means carried by the aircraft for actuating said pitch varying means to cause said aircraft to zoom, and parachute release control means controlled in part by said zoom control means for causing release of said parachute into the slipstream, said zoom control means preventing operation of said parachute release control means until after actuation of said zoom control means, said parachute release control means including means responsive to a decrease in the airspeed to a predetermined value to release said parachute.

8. Recovery apparatus for a high speed aircraft having pitch varying means, comprising a parachute attached to said aircraft and normally held in stowed relationship on said aircraft, zoom control means carried by the aircraft for actuating said pitch varying means to cause said aircraft to zoom, and parachute release control means controlled in part by said zoom control means for causing release of said parachute into the slipstream, said zoom control means preventing operation of said parachute release control means until after actuation of said zoom control means, said parachute release control means including means responsive to a decrease in the airspeed to a predetermined value to release said parachute, and supplmental timer means responsive to the expiration of a predetermined time after the actuation of said zoom control means to also release said parachute.

9. Recovery apparatus for a high speed aircraft having pitch varying means, comprising a parachute attached to said aircraft and normally held in stowed relationship on said aircraft, zoom control means carried by the aircraft for actuating said pitch varying means to cause said aircraft to zoom, and parachute release control means controlled in part by said zoom control means for causing release of said parachute into the slipstream, said zoom control means preventing operation of said parachute release control means until after actuation of said zoom control means, said parachute release control means including timer means responsive to expiration of a predetermined time after the actuation of said zoom control means to release said parachute.

References Cited in the file of this patent

UNITED STATES PATENTS

| | | |
|---|---|---|
| 2,339,011 | Gurney | Jan. 11, 1944 |
| 2,391,896 | Hanson | Jan. 1, 1946 |
| 2,478,758 | Frieder | Aug. 9, 1949 |

FOREIGN PATENTS

| | | |
|---|---|---|
| 619,055 | Germany | Sept. 23, 1935 |